United States Patent [19]
Mukai

[11] Patent Number: 6,028,143
[45] Date of Patent: Feb. 22, 2000

[54] RUBBER COMPOSITION CONTAINING CROSS LINKABLE POLYETHYLENE

[75] Inventor: Uchu Mukai, Kodaira, Japan

[73] Assignee: Bridgestone Corporation, Tokyo, Japan

[21] Appl. No.: 09/189,340

[22] Filed: Nov. 10, 1998

Related U.S. Application Data

[63] Continuation-in-part of application No. 08/855,038, May 13, 1997, abandoned.

[30] Foreign Application Priority Data

May 16, 1996 [JP] Japan .................................. 8-121915

[51] Int. Cl.⁷ .................................................. C08L 23/00
[52] U.S. Cl. .......................... 525/232; 525/192; 525/193; 525/194; 525/197; 525/240
[58] Field of Search .................................... 525/240, 192, 525/193, 194, 197, 232

[56] References Cited

U.S. PATENT DOCUMENTS 4,005,054  1/1977  Bonnefon et al. ...................... 524/521

OTHER PUBLICATIONS

Shinichi et al., "Polymer Alloy Composition and Its Production", Patent Abstracts of Japan, vol. 013, No. 595 (C–672, Dec. 27, 1989).
Mitsuru et al., "Pneumatic Tire", Patent Abstracts of Japan, vol. 016, No. 400 (C–0977), Aug. 25, 1992.

*Primary Examiner*—Mark L. Warzel
*Attorney, Agent, or Firm*—Fish & Richardson P.C.

[57] ABSTRACT

The present invention provides a rubber composition in which the coexistence of low heat build-up, heat resistance and high hardness can be achieved without damaging failure characteristics. According to the present invention, a rubber composition comprising a 100 parts by weight of matrix rubber and a 2–75 parts by weight of a polyethylene composition which contains 0–80% by weight of polyethylene and 20% by weight or more of a composite comprising a polyethylene component and a rubber component previously bonded via a coupling agent to the polyethylene component, said rubber component is crosslinked with the matrix rubber. At least at one of the kneading stages before the final stage, the compound is kneaded so that the maximum temperature of the compound of the kneading of that stage is higher than the melting point of the polyethylene component mixed, preferably, by 10° C. or more.

7 Claims, 2 Drawing Sheets

RUBBER COMPOSITION CONTAINING CROSS LINKABLE POLYETHYLENE

The present application is a continuation-in-part of U.S. application Ser. No. 08/855,038 filed on May 13, 1997 now abandoned, which claims priority under §119 of Japanese Patent Application No. 121915/1996, filed May 16, 1996, the disclosure of which is incorporated herein by reference in its entirety.

FIELD OF THE INVENTION

The present invention relates to a rubber composition suitable for tires, rubber vibration insulators, and the like.

BACKGROUND OF THE INVENTION

As one of the properties required for the tread of tires, cut resistance is given. This property is especially important when tires are used on roads in bad condition, construction sites or the like which are likely to give visible injuries to tires. As a direction toward the improvement of the cut resistance of tread, to improve the hardness of rubber composition and, at the same time, to make the elongation at break larger have been believed to be effective. For improving the hardness of rubber composition, techniques may be considered in which the crosslinking density is increased by mixing carbon black at a high ratio, increasing the content of sulfur, or the like.

According to these techniques, however, the elongation at break is decreased and there occurs a phenomenon called chipping, i.e., rubber chips come off from a tire. In order to improve this property, various tests such as the use of a thermoplastic resin, a thermosetting resin, etc. have been made. However, these attempts often have not been able to achieve a desirable result in other properties, particularly in heat resistance and heat build-up. Thus, sufficient effects have not necessarily been obtained. For example, as seen in Japanese Unexamined Patent Publication No. 48-38338, the compatibility of cut resistance and heat build-up was achieved, but durability and heat resistance were not sufficient.

Not only in the tread of tires but also in other portions of tires, it is important to allow high hardness, heat resistance and low heat build-up to coexist. However, it is an extremely difficult assignment to achieve.

In rubber products other than tires, the coexistence of high hardness and low heat build-up is also required, for example, for rubber vibration insulators, particularly, a rubber for the suspension of vehicles.

As specific examples of pneumatic tires in which polyethylene is mixed, U.S. Pat. No. 4,675,349 and U.S. Pat. No. 5,341,863 are given. The former is characterized by mixing a polyethylene having a softening point of 35° C. or above at a temperature lower than that. In this case, inevitably, the polyethylene should be added in the form of fine particles. Such a polyethylene is difficult to handle at the time of mixing. Furthermore, when mixed, polyethylene particles may aggregate to thereby worsen the physical properties of the resultant compound. The latter is characterized by using LDPE (low density polyethylene) of which the melting point of the crystal falls within a range of 104–115° C. In this case, changes in the physical properties of the resultant rubber composition are drastic at a high temperature, as described later in the description of the present invention. Therefore, the latter composition should be said difficult to use, in particular, as a rubber composition for tires.

Japanese Unexamined Patent Publication No. 7-266454 discloses a pneumatic tire in which LDPE or LLDPE (linear low density polyethylene) is mixed. In this case, changes in the physical properties of the resultant rubber composition are also drastic at a high temperature, and this composition should be said difficult to use, in particular, as a rubber composition for tires.

Generally, when a polyethylene having a low melting point is used, permanent set in fatigue attributable to the creep of the polyethylene is observed in the resultant rubber composition in addition to the above-mentioned problems. Thus, the use of such a polyethylene is not appropriate.

OBJECTS AND SUMMARY OF THE INVENTION

It is an object of the present invention to provide a rubber composition in which the coexistence of low heat build-up, heat resistance, high hardness and resistance to the permanent set can be achieved without damaging failure characteristics.

In order to allow low heat build-up, heat resistance, high hardness and resistance to the permanent set to coexist in a rubber composition, a material (polyethylene in the present invention) to be mixed with the matrix rubber composition has to satisfy the following four essential conditions:

(1) Having a high affinity with the matrix rubber. This influences on basic reinforcing properties and heat build-up.

(2) Having an elastic modulus by far higher than that of matrix rubber composition. This influences on hardness.

(3) Being unsusceptible to phase transition and various chemical reactions at a temperature within the range of usual use.

(4) Not deformed plastically against a minute input. This influences on resistance to the permanent set.

Focusing the attention on the essential conditions described above, the present inventor has made intensive and extensive researches on the blending of various polyethylene resins with rubber. As a result, the inventor has found a rubber composition in which the properties described above coexist. Thus, the present invention has been achieved.

DETAILED DESCRIPTION OF THE INVENTION

Figure 1:
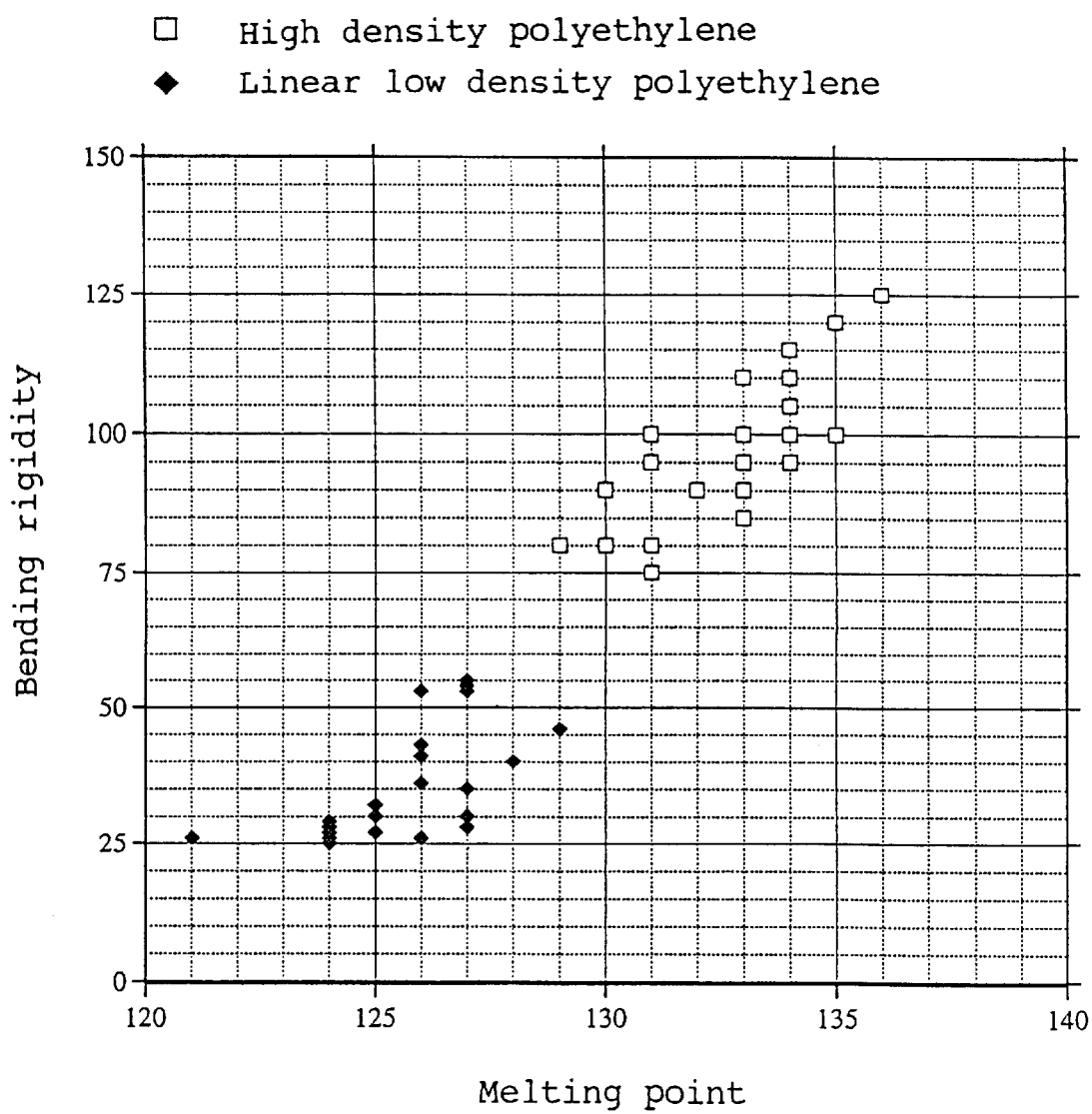
FIG. 1 shows the relationship between bending rigidity and melting point of polyethylene.
Figure 2:
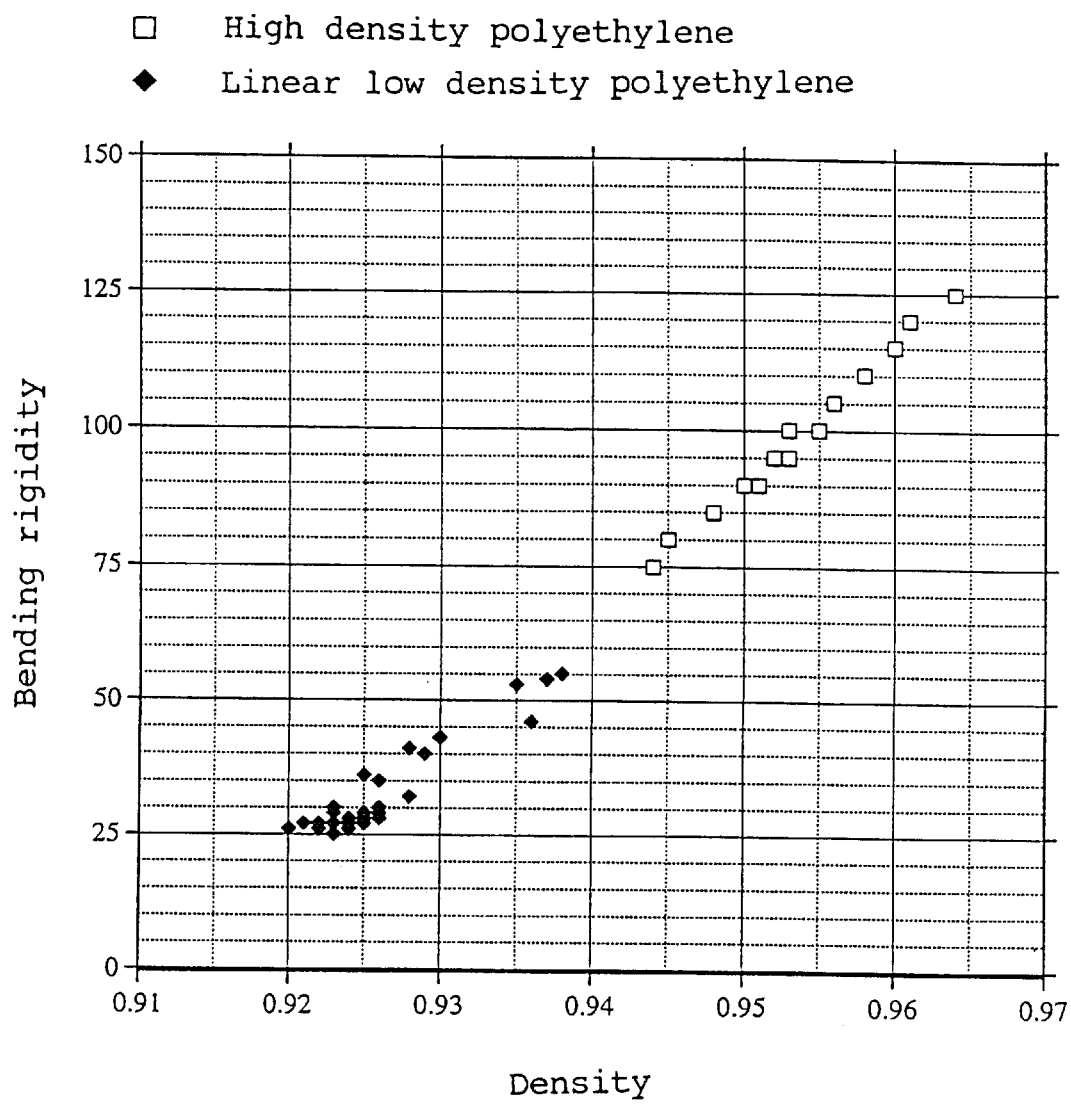
FIG. 2 shows the relationship between bending rigidity and density of polyethylene.

The rubber composition of the invention relates to a rubber composition comprising 100 parts by weight of a matrix rubber and 2–75 parts by weight of a polyethylene composition which contains 0–80% by weight of polyethylene and 20% by weight or more of a composite comprising a polyethylene component and a rubber component previously bonded via a coupling agent to the polyethylene component, said rubber component is crosslinked with the matrix rubber. The polyethylene component used in the composite is preferable a high density polyethylene. Further, when the rubber composition is kneaded through several stages in the preparation, the rubber composition is characterized by being kneaded at least at one of the stages before the final stage so that the maximum temperature of the kneaded composition of said stage is higher than the melting point of the polyethylene component mixed therein preferably by 10° C. or more.

In the present invention, high density polyethylene has a density of 0.94 or more, and polyethylene with a density of less than 0.94 is described as low density.

The amount of a polyethylene resin component to be mixed should be 2–75 weight parts relative to 100 weight parts of the rubber component of the composition. When the amount is less than 2 weight parts, no clear difference is observed and the effect of the invention is not achieved. When the amount is more than 75 weight parts, the characteristics as a rubber composition are lost and, especially, fatigue properties, such as breaking life against repeated strain, become worse.

Twenty percent by weight or more of the polyethylene composition to be added should be a composite comprising polyethylene component previously bonded via a coupling agent to a rubber component. Since sufficient resistance to the permanent set cannot be obtained if only a non-crosslinkable high density polyethylene has been added, it is necessary to inhibit plastic deformation by crosslinking to some extent the non-crystalline portion of the polyethylene in order to overcome this problem. Although the physical property of a rubber composition can be sufficiently improved by using a polyethylene which has been already crosslinked, the polyethylene should be added and mixed in the form of fine particles in this case in order to improve the dispersibility, which is not desirable in view of processability. Preferably, a high density polyethylene which undergoes crosslinking after being sufficiently dispersed in a matrix rubber is used.

The ratio of the composite comprising polyethylene component previously bonded via a coupling agent to a rubber component has been set at 20% by weight, or more preferably, 35–100% by weight because the effect is small if the ratio is less than 20% by weight to the total polyethylene and the improvement of physical properties become remarkable if the ratio is 35% by weight or more. In addition, the ratio of the composite in the polyethylene mixture is preferably 50% by weight or more, more preferably 80% by weight or more. When a polyethylene contains 35–100% by weight of a composite previously bonded via a coupling agent, the effect of the improvement of physical properties is most remarkable.

The rubber composition is prepared through kneading at a temperature which is higher than the melting point of the composite, preferably, by 10° C. or more. The ratio of the polyethylene component and the rubber component in the composite ranges preferably from 100/100 to 100/50. Kneading is performed through several stages. It is preferred that at least at one stage of these stages before the final stage the maximum temperature of the kneaded composition be higher than the melting point of the composite mixed therein, preferably, by 10° C. or more. If kneaded at a lower temperature than the melting point of polyethylene, the viscosity of the polyethylene will be high and, as a result, the dispersibility of the polyethylene and the affinity thereof with the matrix rubber will be insufficient. These may result in a deterioration in the breaking characteristics of the resultant rubber composition.

As the matrix rubber component to be used in the rubber composition of the invention, diene rubbers such as natural rubber (NR), polyisoprene rubber (IR), polybutadiene rubber (BR) or styrenebutadiene copolymer (SBR) may be used independently or in combination. When the matrix rubber contains natural rubber or polyisoprene, the effect of the rubber composition of the invention becomes maximum.

As the rubber component used in the composite, similar to the matrix rubber component, diene rubbers such as natural rubber, polyisoprene rubber, polybutadiene rubber or styrene-butadiene copolymer (SRB) may be used independently or in combination, and natural rubber is particularly preferable. The coupling agent that can be used is a usual silane coupling agent, particularly preferably is γ-methacryloxy propyl trimethoxy silane. Needless to say, appropriate amounts of conventional additives including a filler such as carbon black, silica; a softener such as aromatic oil, spindle oil; an anti-oxidant; a vulcanizing agent; a vulcanization accelerator; and a vulcanization activator may be suitably added to the rubber composition of the invention.

PREFERRED EMBODIMENTS OF THE INVENTION

Hereinbelow, the present invention will be described in more detail with reference to the following Examples and Comparative Examples. The present invention, however, is not limited to these Examples.

Rubber compositions were prepared using various polyethylene resins shown in Table 1 according to the mixing recipes shown in Tables 2 and 3. Each of the compositions was mixed and kneaded using a 250 ml LABO PLASTOM-ILL (manufactured by Toyoseiki Co.) and with 3 inch rolls. The mixing and kneading process consisted of two stages.

At the first stage, chemicals excluding those which greatly influence upon the crosslinking of the matrix rubber at a high temperature (e.g., a vulcanizing agent, vulcanization accelerator, and vulcanization activator), rubber component, polyethylene, carbon black and the like were added. At the second stage, chemicals and the like which were not added at the first stage were added and kneaded at a lower temperature than that of the first stage, γ-methacryloxy propyl trimethoxy silane was used as the coupling agent.

Then, the resultant composition was vulcanized and various measurements were carried out according to the methods described below The vulcanizing conditions were at 145° C. and for 30 minutes. The results are shown in Table 4.

(1) Characteristics of Polyethylene
(a) Measurement of melting point (Tm)
The melting point (Tm) of a polyethylene was measured with a differential scanning calorimeter (Model DSC200 manufactured by Seiko Electronics Industry) at a nitrogen flow rate of 20 ml/min for the range from 20° C. to 180° C. at a heating rate of 10° C./min. The melting point was defined as a temperature at which an endothermic peak converge.

(b) Measurement of melt flow rate

The measurement was conducted based on JIS K6760-1981.

(c) Bending rigidity

The measurement was conducted based on JIS K6760-1981 with an Olsen flow tester.

(2) Measurement of the Temperature of a Compound

The maximum temperature of the rubber compound of the first stage of kneading was measured using a thermocouple provided at the mill.

(3) Various Physical Properties of a Rubber Composition (a) Measurement of hardness Based on JIS K6301-1995, the spring type hardness (type A) was measured at 25C.

(b) Tensile strength, at the time of breaking (Tb)

The measurement was based on JIS K6301-1995.

(c) Elongation at the time of breaking (Eb)

The measurement was based on JIS K6301-1995.

(d) Method for measuring permanent set

A vulcanized rubber sample of a dumbbell shape was deformed to 400% at 25° C. under tension mode at a rate of strain of 12.5% per second. Then, the load was removed and after 24 hours the length of the sample was measured. The permanent set was calculated by the formula given below. The reciprocal of the thus calculated values were reduced to index numbers in which the value for Comparative Example 1 is 100. This means that the greater the index number, the smaller the permanent set. Permanent set (%)=(The length of the sample after the removal of the load/The original length of the sample as cut off from the rubber sheet)×100.

(e) Hysteresis loss characteristics

Using a dynamic mechanical analyzer manufactured by Rheometrics Corp., U.S.A., Tan δ was measured after giving a sample a dynamic oscillation strain (amplitude: 1.0%; frequency: 15 Hz) at 50° C. The reciprocal of thus measured values were reduced to index numbers in which the value for Comparative Example 1 is 100. Accordingly, the greater the index number, the less the hysteresis loss and the lower the heat build-up.

TABLE 1

Characteristics of Polyethylene Resins

|  | A | B | C | D |
|---|---|---|---|---|
| Melting point (° C.) | 136 | 108 | 124 | 136 |
| Density | 0.964 | 0.920 | 0.923 | 0.958 |
| Bending rigidity (kg/cm$^2$) | 12,500 | 1,550 | 2,700 | 12,000 |

A. High density polyethylene (Mitsubishi Chemical, Product Name: HJ560)
B. Low density polyethylene (Mitsubishi Chemical, Product Name: HE30)
C. Linear low density polyethylene (Mitsubishi Chemical, Product Name: UF340)
D. Silane crosslinking polymer (Mitsubishi Chemical, Product Name Linklon HF-700N)

Component A in Table 1, is a general-purpose polyethylene and is a high density polyethylene composite consisting of 100% composite (Mitsubishi Chemical, Product Name: HJ560). The rubber:polyethylene ratio in the composite is 100:75.

TABLE 2

|  | Weight part |
|---|---|
| Matrix rubber*$^1$ | 100 |
| Polyethylene | variable |
| Carbon black (N330) | 50 |
| Aromatic oil | 3 |
| Steric acid | 2 |
| Anti-oxidant 6C*$^2$ | 1 |
| Zinc oxide | 3 |
| Vulcanization accelerator DPG*$^3$ | 0.5 |
| Vulcanization accelerator DM*$^4$ | 0.6 |
| Sulfur | 1.5 |

*$^1$IR200, SBR1500 and BR01 (Japan Synthetic Rubber Co., Ltd.) were used independently or in combination.
*$^2$N'-(1,3-dimethylbutyl)-N'-phenyl-p-phenylenediamine
*$^3$Diphenylquanidine
*$^4$Dibenzathiazyldisulfide

TABLE 3

|  | IR2200 | SBR1500 | BR01 | C/B | Temp. (° C.) | Polyethylene Kind | Amount (phr) | |
|---|---|---|---|---|---|---|---|---|
| Comparative Example 1 | 100 | 0 | 0 | 50 | 150 | — | 0 | |
| Comparative Example 2 | 50 | 50 | 0 | 50 | 150 | — | 0 | |
| Comparative Example 3 | 50 | 0 | 50 | 50 | 150 | — | 0 | |
| Comparative Example 4 | 100 | 0 | 0 | 50 | 155 | A | 2 | |
| Comparative Example 5 | 100 | 0 | 0 | 50 | 155 | A | 10 | |
| Comparative Example 6 | 100 | 0 | 0 | 50 | 155 | A | D | 0.5 | 0.5 |
| Example 1 | 100 | 0 | 0 | 50 | 155 | A | D | 1 | 1 |
| Example 2 | 100 | 0 | 0 | 50 | 155 | A | D | 8 | 2 |
| Example 3 | 100 | 0 | 0 | 50 | 155 | A | D | 7 | 3 |
| Example 4 | 100 | 0 | 0 | 50 | 155 | A | D | 6.5 | 3.5 |
| Example 5 | 100 | 0 | 0 | 50 | 155 | A | D | 5 | 5 |
| Example 6 | 100 | 0 | 0 | 50 | 155 | A | D | 3 | 7 |
| Example 7 | 100 | 0 | 0 | 50 | 155 | A | D | 0 | 10 |
| Comparative Example 7 | 100 | 0 | 0 | 50 | 155 | A | D | 40 | 40 |
| Comparative Example 8 | 100 | 0 | 0 | 50 | 155 | B | | 10 | |
| Comparative Example 9 | 100 | 0 | 0 | 50 | 155 | C | | 10 | |
| Comparative Example 10 | 100 | 0 | 0 | 50 | 155 | B | D | 5 | 5 |
| Comparative Example 11 | 100 | 0 | 0 | 50 | 155 | C | D | 5 | 5 |
| Example 8 | 50 | 50 | 0 | 50 | 155 | A | D | 5 | 5 |
| Example 9 | 50 | 0 | 50 | 50 | 155 | A | D | 5 | 5 |

TABLE 3-continued

|  | IR2200 | SBR1500 | BR01 | C/B | Temp. (° C.) | Polyethylene | |  |
| --- | --- | --- | --- | --- | --- | --- | --- | --- |
|  |  |  |  |  |  | Kind | Amount (phr) | |
| Example 10 | 100 | 0 | 0 | 45 | 155 | A | D | 5 | 5 |
| Example 11 | 100 | 0 | 0 | 50 | 145 | A | D | 5 | 5 |
| Comparative Example 12 | 100 | 0 | 0 | 50 | 155 | A |  | 75 |  |
| Example 12 | 100 | 0 | 0 | 50 | 155 | A | D | 40 | 35 |

(In the above Table, "Temperature" represents the maximum temperature of each compound during mixing and kneading. C/B means carbon black.)

TABLE 4

|  | Hardness | Tb (M Pa) | Eb (%) | Permanent set | Tan δ |
| --- | --- | --- | --- | --- | --- |
| Comparative Example 1 | 64 | 28.4 | 490 | 100 | 100 |
| Comparative Example 2 | 64 | 26.5 | 460 | 98 | 98 |
| Comparative Example 3 | 65 | 26.5 | 450 | 99 | 105 |
| Comparative Example 4 | 65 | 28.9 | 515 | 96 | 102 |
| Comparative Example 5 | 69 | 29.4 | 520 | 91 | 102 |
| Comparative Example 6 | 64 | 28.4 | 490 | 97 | 101 |
| Example 1 | 67 | 29.4 | 510 | 98 | 103 |
| Example 2 | 71 | 29.4 | 520 | 95 | 102 |
| Example 3 | 71 | 29.4 | 520 | 95 | 101 |
| Example 4 | 73 | 29.4 | 515 | 98 | 101 |
| Example 5 | 74 | 29.4 | 510 | 98 | 102 |
| Example 6 | 74 | 28.9 | 510 | 98 | 101 |
| Example 7 | 73 | 28.9 | 505 | 99 | 101 |
| Comparative Example 7 | 82 | 27.5 | 400 | * | 98 |
| Comparative Example 8 | 65 | 26.5 | 520 | 89 | 101 |
| Comparative Example 9 | 66 | 27.5 | 515 | 89 | 101 |
| Comparative Example 10 | 66 | 26.5 | 515 | 91 | 101 |
| Comparative Example 11 | 67 | 27.5 | 510 | 91 | 101 |
| Example 8 | 67 | 27.9 | 505 | 95 | 100 |
| Example 9 | 69 | 27.9 | 495 | 96 | 107 |
| Example 10 | 72 | 29.4 | 520 | 98 | 107 |
| Example 11 | 75 | 27.9 | 490 | 98 | 103 |
| Comparative Example 12 | 79 | 27.0 | 460 | 48 | 100 |
| Example 12 | 82 | 27.9 | 465 | 55 | 100 |

* As described previously, the sample had to be deformed up to 400%. Before that point the sample has broken and thus the measurement of permanent set was impossible.

Comparative Example 1 is an example in which polyisoprene is used as the rubber component and no polyethylene resin is mixed at all. This example was used as a control for evaluating physical properties.

When Comparative Example 6 is compared with Examples 1–7, it is found that when the polyethylene content of a rubber composition is small, its hardness and Eb are low and that improvement effects over Comparative Example 1 cannot be obtained. When Comparative Example 7 is compared with Example 12, it is shown that when the polyethylene content exceeds 75% by weight, Eb decreases drastically and the balance among physical properties (hardness, Tb, Eb) is lost. Further, it is found that even if the ratio of a crosslinkable polyethylene is varied, an excellent performance is obtained as long as the ratio falls within the range specified by the present invention. Comparative Example 12 and Example 12 represent a system with a large polyethylene content. In these examples, it is also seen that physical properties are improved by the addition of a crosslinkable polyethylene.

When Comparative Examples 2 and 3 are compared with Examples 8 and 9, it is found that similar tendencies are also observed even if the matrix rubbers are different.

From Example 10, it is seen that the replacement of a part of carbon black with polyethylene is advantageous from the viewpoint of the compatibility of Tb with small tan d. From Example 11, it is seen that failure characteristics will be affected unless the temperature of the kneaded compound is not higher than the melting point of the polyethylene resin by 10° C. or more.

Comparative Examples 4, 5, 8 and 9 are examples in which a crosslinkable polyethylene is not used. In Comparative Example 4, although resistance to the permanent set is not bad, hardness is not improved. In Comparative Example 5, although hardness is improved, resistance to the permanent set is bad. In Comparative Examples 8 and 9, both hardness and resistance to the permanent set are not good.

Although a crosslinkable polyethylene is mixed in Comparative Examples 10 and 11, a low density polyethylene is also contained. Therefore, they are inferior to Examples 5–7 in both hardness and resistance to the permanent set.

As is clear from the results shown in Table 4, Examples 1–12 satisfying the conditions of the present invention are rubber compositions in which the coexistence of low heat build-up, heat resistance, high hardness and resistance to the permanent set can be achieved without damaging failure characteristics.

On the other hand, in those rubber compositions as shown in Comparative Examples 1–12 which do not satisfy all of the conditions of the present invention, at least one of the following properties of failure characteristics, low heat build-up, heat resistance and high hardness become worse.

EFFECT OF THE INVENTION

According to the present invention, a rubber composition comprising a 100 parts by weight of matrix rubber and a 2–75 parts by weight of a polyethylene composition which contains 0–80% by weight of polyethylene and 20% by weight or more of a composite comprising a polyethylene component and a rubber component previously bonded via a coupling agent to the polyethylene component, wherein the rubber component is crosslinked with the matrix rubber improves the dispersion of the polyethylene into the matrix rubber composition and raises the interaction at interfaces between the polyethylene and the matrix rubber, to thereby allow the coexistence of low heat build-up, heat resistance, high hardness and resistance to the permanent set without damaging failure characteristics.

What is claimed is:

1. A rubber composition, comprising:

100 parts by weight of a matrix rubber; and

2–75 parts by weight of a polyethylene composition which contains 0–80% by weight of polyethylene and 20% by weight or more of a composite, comprising a polyethylene component; and a rubber component previously bonded via a coupling agent to the polyethylene component, wherein the rubber component is crosslinked with the matrix rubber.

2. The rubber composition of claim 1, wherein the composite contains about 35–100% by weight of the polyethylene component.

3. The rubber composition of claim 1 or 2, wherein the polyethylene component is a high density polyethylene.

4. The rubber composition of claim 1 or 2, wherein the rubber composition is prepared through kneading at a temperature which is higher by about 10° C. or more than the melting point of the composite.

5. The rubber composition of claim 1 or 2, wherein the rubber composition is prepared through several kneading stages in which the rubber composition is kneaded at least once prior to a final stage so that the maximum temperature of the kneaded rubber composition is higher than the melting point of the mixed composite.

6. A rubber composition, comprising:

100 parts by weight of a matrix rubber; and

2–75 parts by weight of a polyethylene composition which contains 0–80% by weight of polyethylene and 20% by weight or more of a composite, comprising a polyethylene component; and a rubber component previously bonded via a coupling agent to the polyethylene component, wherein the rubber component is crosslinked with the matrix rubber and wherein the rubber composition is prepared through kneading at a temperature which is higher by about 10° C. or more than the melting point of the composite.

7. A rubber composition, comprising:

100 parts by weight of a matrix rubber; and

2–75 parts by weight of a polyethylene composition which contains 0–80% by weight of polyethylene and 20% by weight or more of a composite, comprising a polyethylene component; and a rubber component previously bonded via a coupling agent to the polyethylene component, wherein the rubber component is crosslinked with the matrix rubber and wherein the rubber composition is prepared through several kneading stages in which the rubber composition is kneaded at least once prior to a final stage so that the maximum temperature of the kneaded rubber composition is higher than the melting point of the mixed composite.

* * * * *